Figure 1:
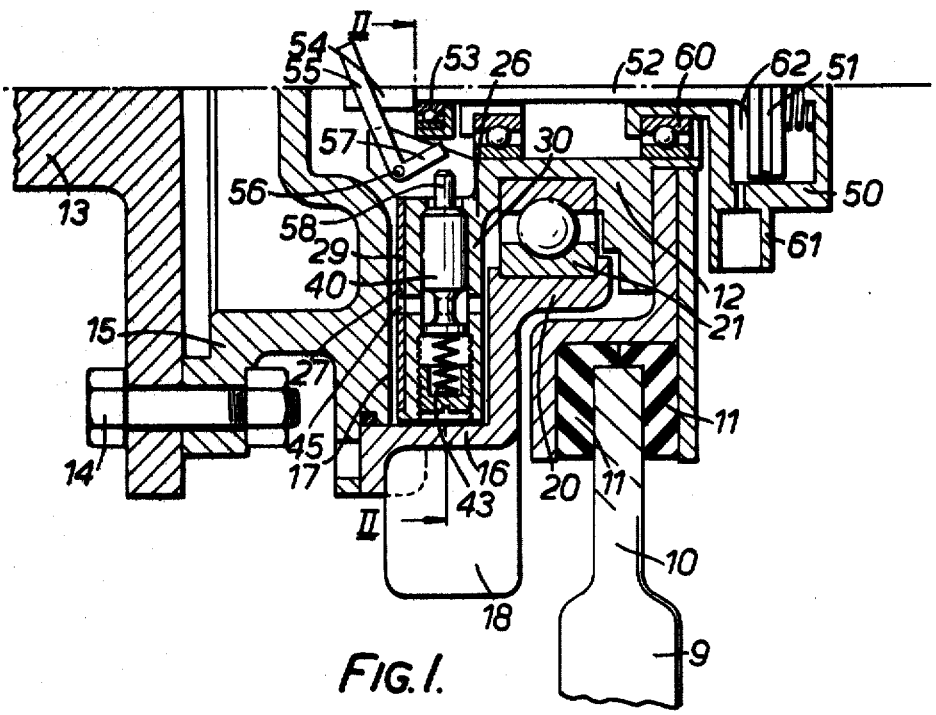

United States Patent [19]

Elmer

[11] 3,893,555
[45] July 8, 1975

[54] ROTARY FANS

[75] Inventor: Arthur Ernest Henry Elmer, Painswick, England

[73] Assignee: Dynair Limited, Gloucestershire, England

[22] Filed: Mar. 8, 1974

[21] Appl. No.: 449,375

[30] Foreign Application Priority Data
May 24, 1973 United Kingdom............... 24931/73

[52] U.S. Cl.............. 192/58 B; 123/41.12; 416/32; 416/169
[51] Int. Cl............................................. F01p 7/02
[58] Field of Search...... 123/41.12; 192/58 R, 58 A, 192/58 B, 58 C; 416/32, 169

[56] References Cited
UNITED STATES PATENTS

| | | | |
|---|---|---|---|
| 3,002,595 | 10/1961 | Weir.................................. | 192/58 B |
| 3,144,922 | 8/1964 | Weir.................................. | 123/41.12 |
| 3,155,209 | 11/1964 | Weir.................................. | 123/41.12 |
| 3,179,221 | 4/1965 | Weir.................................. | 123/41.12 |
| 3,217,849 | 11/1965 | Weir.................................. | 123/41.12 |
| 3,227,254 | 1/1966 | Sutaruk.............................. | 123/41.12 |
| 3,339,688 | 9/1967 | Harvey............................... | 123/41.12 |
| 3,388,694 | 6/1968 | Elmer................................. | 123/41.12 |
| 3,467,071 | 9/1969 | Elmer................................. | 123/41.12 |
| 3,490,686 | 1/1970 | Weir.................................. | 416/32 |
| 3,741,359 | 6/1973 | Leichliter.......................... | 192/58 A |

Primary Examiner—Manuel A. Antonakas
Assistant Examiner—Daniel J. O'Connor
Attorney, Agent, or Firm—Young & Thompson

[57] ABSTRACT

A variable speed thermostatically controlled cooling fan for an internal combustion motor, especially for an automobile. Within the fan hub is incorporated a viscous slipping clutch including an inner rotary member contained within an outer fluid casing. Fluid can be withdrawn from the casing to a central reservoir by means of scoops and the flow of fluid is controlled by a valve which may be actuated by a bi metal strip incorporated in the fan hub, or by a pneumatic piston located in the hub and controlled from a remote thermal sensing valve.

8 Claims, 9 Drawing Figures

ROTARY FANS

This invention relates to rotary cooling fans of the type incorporating a variable speed drive, as used for example in cooling fans of internal combustion engines, particularly those designed for use with motor vehicles.

It is well known that the cooling requirements of any engine on a motor vehicle vary considerably in different conditions and if a cooling fan is directly driven by an engine at engine speed or at a speed proportional to engine speed the cooling effect may be very inefficient. For example on starting, when the engine is cold, it is obviously unnecessary to drive a cooling fan at full speed, and similarly if descending long hills against head winds and in low ambient temperatures it may be quite unnecessary to operate the cooling fan at all for long periods. On the other hand when climbing steep gradients, with heavy loads, and at high ambient temperatures, the cooling fan must obviously be driven at a considerable speed to provide the required cooling effect, especially on large heavy duty vehicles.

Difficulties however are also encountered if a simple clutch is incorporated in the drive to the fan since the cooling capacity of the fan must be adequate for the operating conditions even when the engine speed is not in the top part of its range, whereas when the engine is running at high speeds the fan speed will then become quite excessive causing considerable wastage of power and serious noise problems.

Accordingly it is an object of the present invention to provide an improved rotary cooling fan with a variable speed drive which will better meet the operating requirements of an engine cooling fan.

Broadly stated the invention consists in a rotary cooling fan including a variable speed torsion drive, comprising an annular casing provided with means for connection to an input drive shaft at one end, an output shaft extending through a central aperture at the other end of the casing and having a plurality of fan blades secured thereto, an inner rotary body located within the casing and secured to the output shaft, the rotary body and the casing being formed with cooperating closely spaced surfaces, means for retaining a quantity of a viscous liquid in the space between the surfaces, a liquid reservoir formed in the rotary body or the output shaft, means for impelling liquid from the clearance space to the reservoir as a result of relative rotation between the rotary body and casing, valve means controlling the return flow of liquid from the reservoir to the clearance space, a temperature responsive element, and actuating means for operating the valve in response to sensed changes of temperature.

The liquid impelling device preferably includes a scoop or fluid pick-up carried by the rotary body adjacent its periphery, and so arranged that on relative rotation occurring liquid is withdrawn from the space between the surfaces and directed to the reservoir.

Preferably the casing is formed with external cooling fins, and the fan blades are supported from the drive shaft through an elastomeric mounting. The heat generated in the viscous liquid is therefore dissipated largely through the casing, and the elastomeric mounting for the fan blades is not subject to excessive temperatures which would cause damage.

Conveniently the reservoir is positioned centrally on the axis of rotation, and the rotary body is a thin annular plate.

The temperature responsive element may be remotely positioned and connected to a fluid pressure actuator mounted on or within the fan hub, via a servo linkage or control system. In some preferred forms of the invention however the temperature responsive element is mounted on the output shaft, and is connected to the valve through a force-multiplying device.

Figure 2:
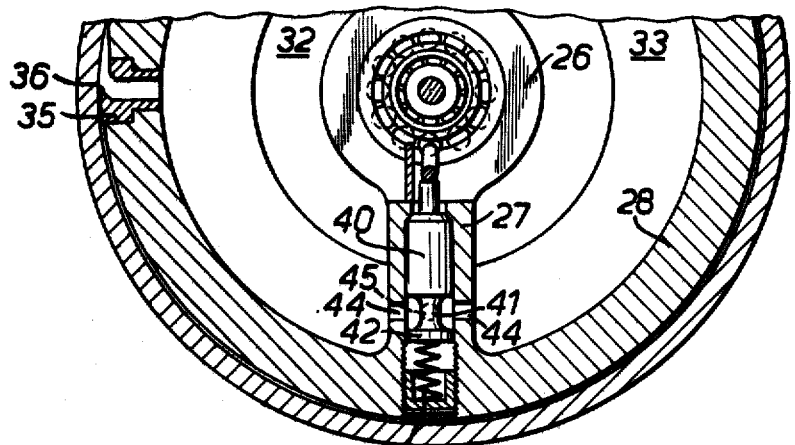
Figure 3:
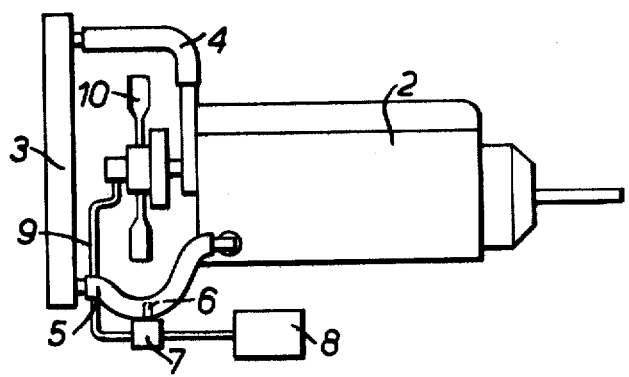
Figure 6:
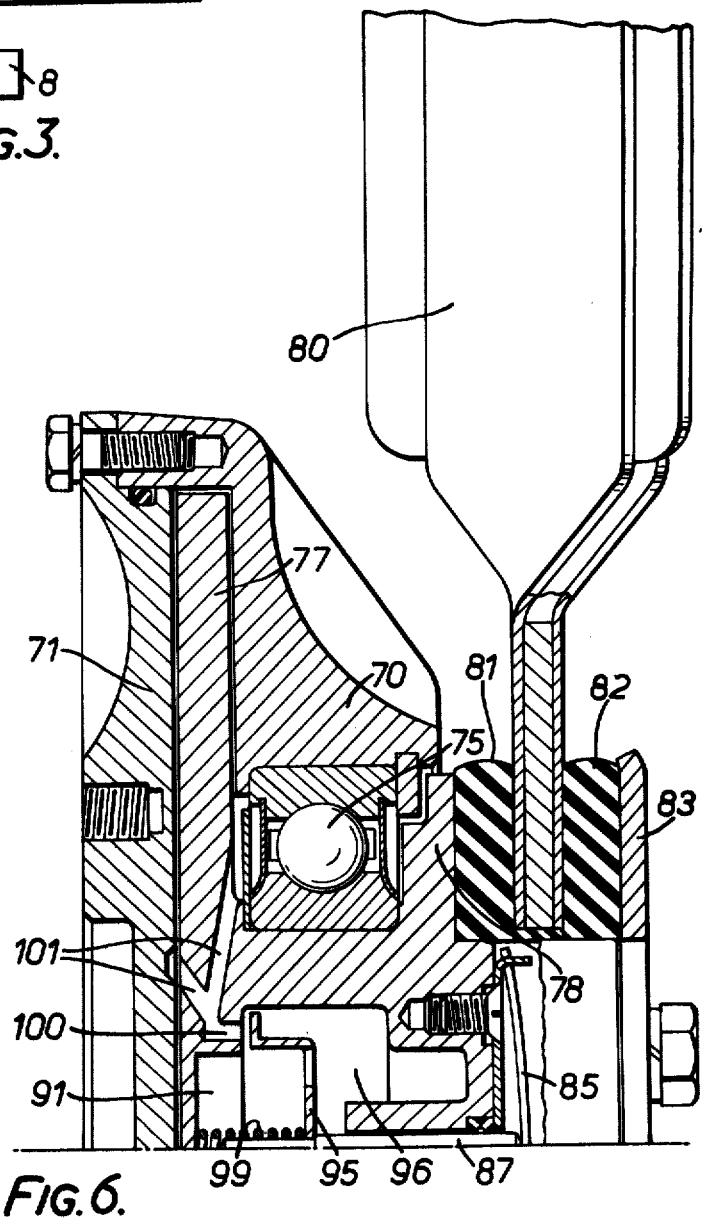
Figure 5:
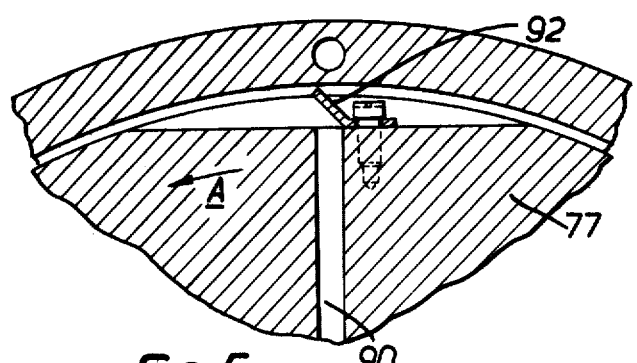
Figure 4:
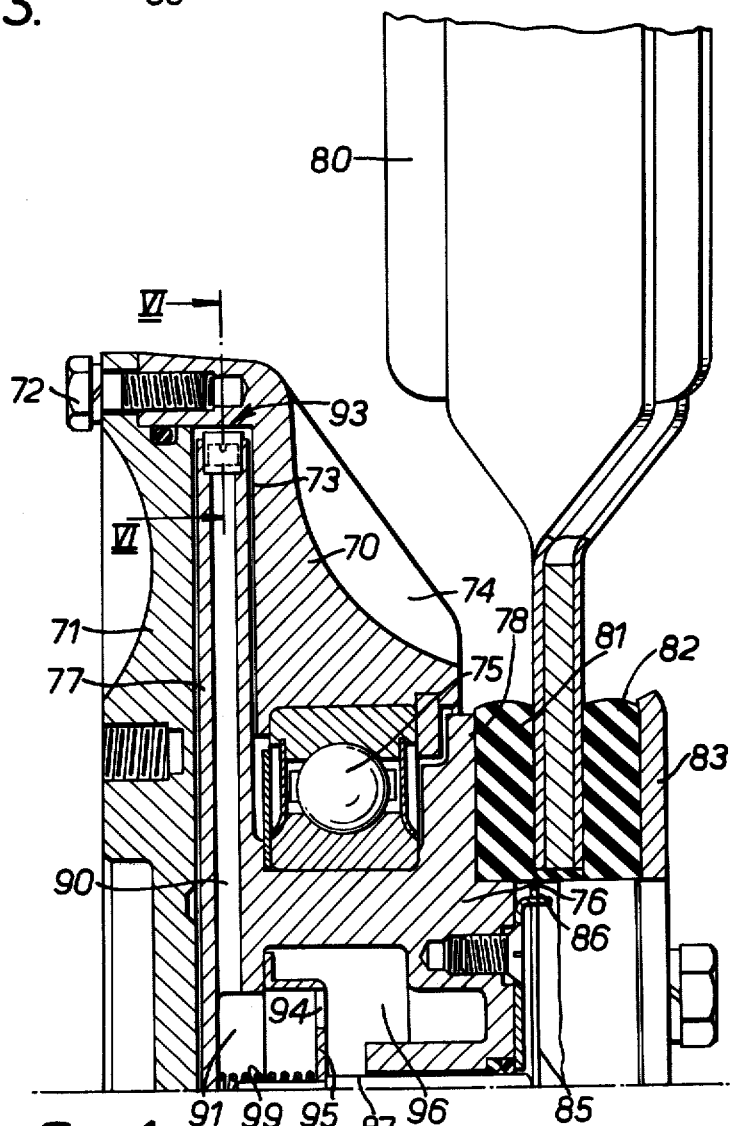
Figures 7, 8:
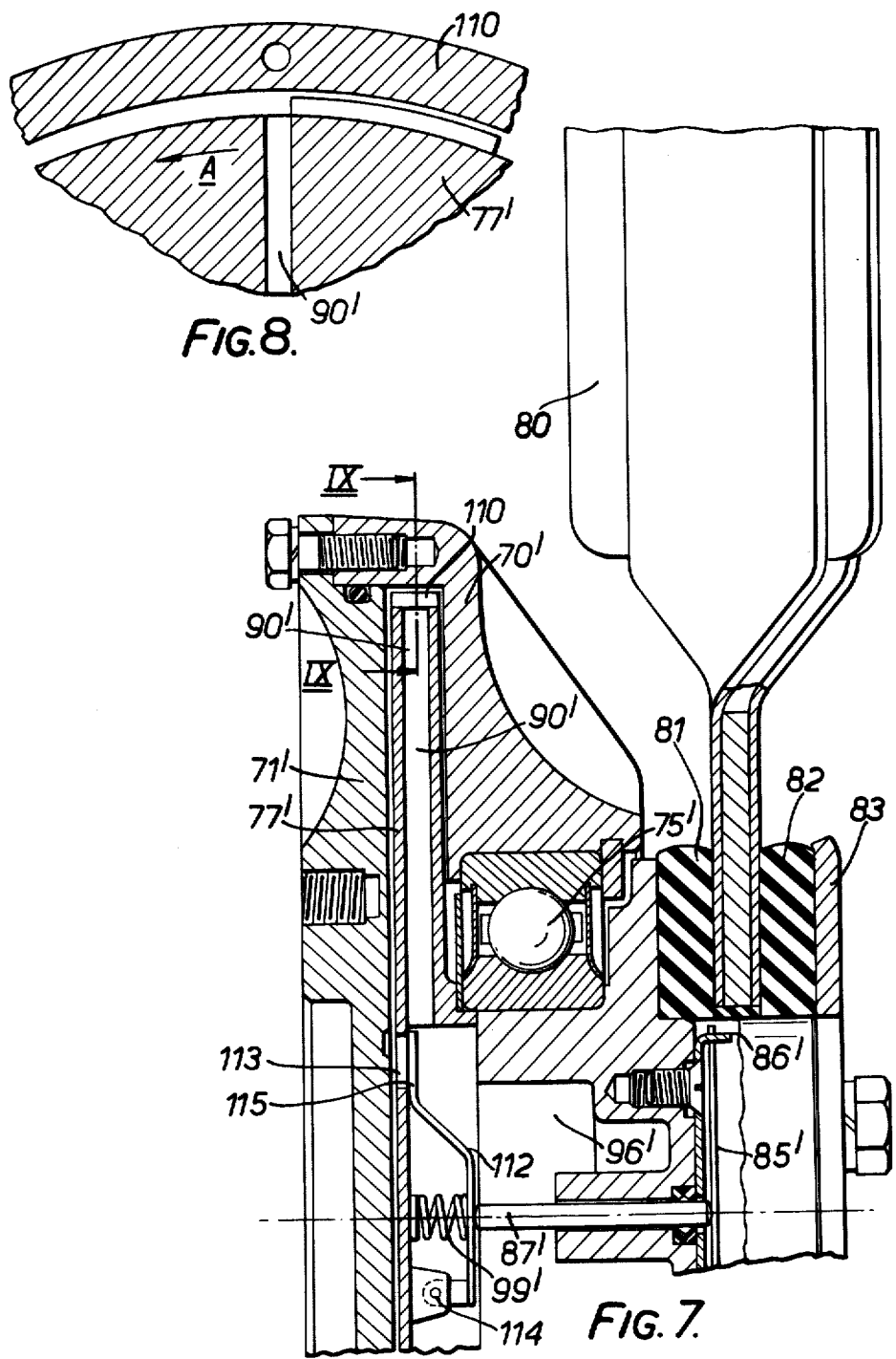
Figure 9:
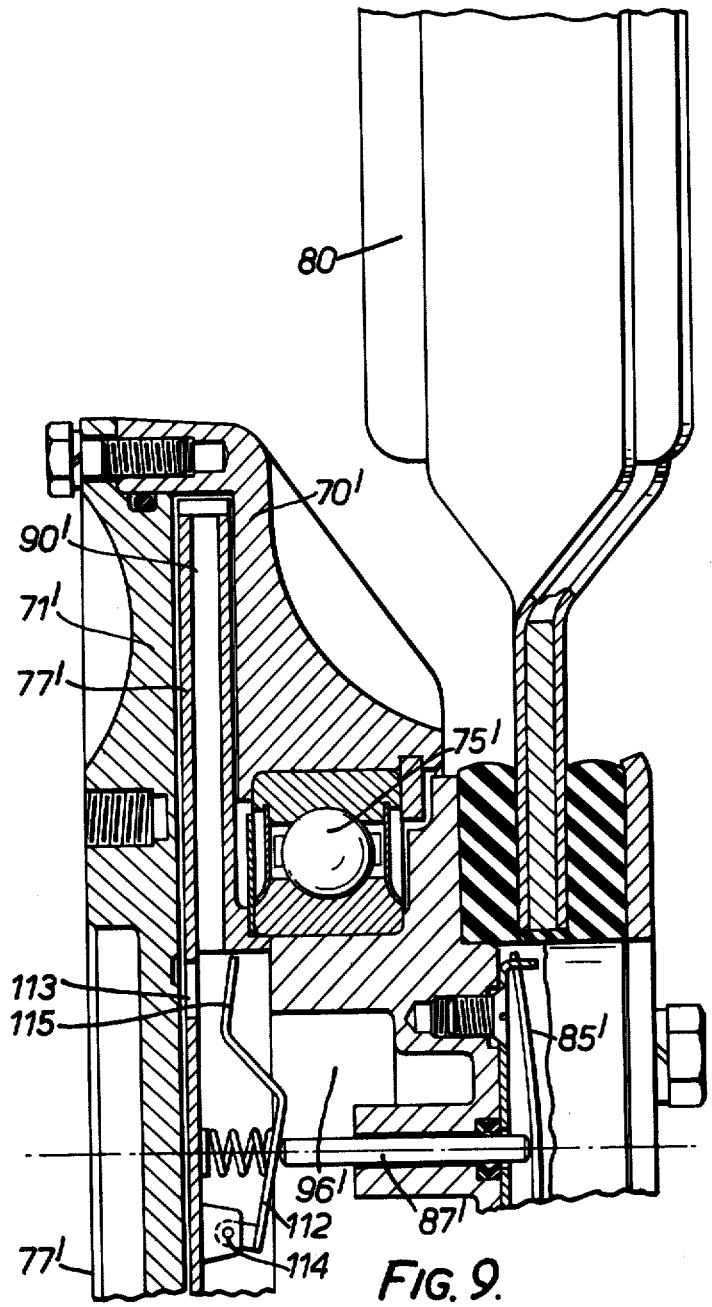

The invention may be performed in various ways and three specific embodiments will now be described by way of example with reference to the accompanying drawings, in which:

FIG. 1 is a half-sectional side elevation through a hub of a rotary cooling fan according to the invention, FIG. 2 is a cross section on the line II—II in FIG. 1 with the casing omitted for clarity, FIG. 3 is a diagrammatic illustration of the cooling fan in position on a vehicle engine, FIG. 4 is a sectional side elevation of a further modification including a bi-metallic thermal control element, FIG. 5 is a fragmentary end elevation on the line V—V in FIG. 4, FIG. 6 is a sectional elevation corresponding to FIG. 4 in a different radial plane and showing the valve in an open condition, FIG. 7 is a sectional elevation corresponding to FIG. 4 of a further embodiment, FIG. 8 is a view corresponding to FIG. 5 on the line VIII—VIII in FIG. 7, and FIG. 9 is a sectional elevation corresponding to FIG. 6 showing the parts in a valve-open condition.

Referring to the example illustrated in FIGS. 1 and 2 the blades 9 of the fan are mounted on a ring 10 supported in a pair of rubber cushioning rings 11 carried by a rotary boss 12 at the front end of the hub. The fan drive shaft 13, which may be driven at engine speed or half engine speed for example, is directly connected by bolts 14 to rotary flange member 15 to which is secured a casing 16 which defines with the flange 15 an annular chamber or cavity 17. The casing 16 is also provided with a series of external radial cooling fins 18 and a part of the casing extends forwardly at 20 and carries a thrust bearing 21 by which the fan boss 12 is supported and located relative to the casing 16 and the drive shaft 13. The whole fan hub unit is thus supported by the drive shaft 13.

The fan boss 12 is rigidly connected to a rotary body or assembly lying within the chamber 17 and comprising a central hub 26 from which project radially a pair of hollow spokes 27 formed integral at their outer ends with a ring 28 (see FIG. 2). The ring 28, with end walls 29, 30 forms two internal cavities or reservoirs 32, 33.

Each of the hollow spokes 27 contains a fluid control valve 40, and the ring 28 includes a pick-up oil scoop 35 having a sharp lip 36 at its periphery designed to pick up oil from the space between the ring 28 and the walls of the casing 16 and to deliver the oil into the cavity 32. Each of the valves 40 comprises a piston connected by a valve stem 41 to a head 42 abutting against a compression spring 43 which urges the valve radially inwards towards the rotary axis. When the valve is in its radially innermost position as illustrated in FIG. 2 the cavities 32, 33 can communicate via the ports 44 with outlet ports 45 in the walls 29, 30, one on each side of the assembly as shown in FIG. 1, so that the fluid can return to the small space or gap between the end walls 29, 30 and the adjacent side walls of the casing 16.

The fan drive as illustrated operates as follows. When the engine drive shaft 13 is rotating below a predetermined speed, and assuming that the fan is also driven at a comparable speed, the spring 43 overcomes the centrifugal force generated by the mass 40 and the valve is held inwards so that the valve ports 44 are open and fluid picked up by the scoop 36 is returned to the operative clearances of the viscous drive device via the port 45. In these conditions the rotation imparted to the hub 26, and hence to the fan blade ring 10, is approximately proportional to the engine speed, as shown in the left hand part of the characteristic curve in FIG. 3. When the engine speed reaches a value at which the centrifugal force on the mass 40 begins to overcome the spring 43 the valve piston 40 begins to close the ports 44 so reducing the return flow of oil via the port 45. The oil in the clearance between the end walls 29, 30 and the opposite end walls of the casing is thus transferred to the cavities 32, 33, so reducing the torsional drive capacity. The effect is to produce a substantially constant fan speed since any reduction in the fan speed will cause the valve to open and vice versa. The fan speed is thus limited to a predetermined value which is substantially independent of the engine speed and also independent of temperature and viscosity. It will be noted that in the construction of FIG. 1 the fan blade ring 10 can be mounted in the rubber cushioning ring 11 without risk of damage from the heat generated in the casing 16, since the output of the viscous drive is connected to the internal member 26, etc, and the casing 16 of the drive is connected to the engine drive shaft 13.

The cooling fan assembly also includes a thermally responsive element arranged to act on each of the valve 40. As illustrated in FIG. 3 the cooling circuit of the engine 2 includes a radiator 3, and liquid coolant hose connections 4 and 5. The thermal senser 6 is located in the lower hose 5, and operates a pneumatic valve 7 which controls the supply of compressed air from an air pump or reservoir 8, via a flexible pressure line 9 to the fan hub unit.

The thermal actuator in the fan hub comprises a pneumatic ram unit designed to be inserted from the front end of the fan hub along the rotary axis within the fan boss 12 and hub 26. This ram actuator includes a ram cylinder or casing 50 containing a ram piston 51 attached to a piston rod 52 movable axially on the axis of the fan and connected at its inner end via a thrust bearing 53 to an operating stud 54. This stud is pivotally connected to one limb 55 of a bell crank lever which is pivotally mounted at 56 on a part attached to the central hub 26, while the other limb of the bell crank lever 57 is arranged to bear on a pin 58 formed on the inner end of the valve piston 40. The ram cylinder is located axially relative to the fan boss 12 by a thrust bearing 60.

When the sensed temperature falls, i.e. the sensed temperature of the cooling water in the lower return hose 5, compressed air is admitted via the flexible tube 9 to an air inlet 61 for the pneumatic ram, and the air in the ram cylinder 62 exerts a forward force on the piston 51 which results in clockwise movement of the bell crank lever about its pivot 56 thus urging the valve piston 40 radially outwards against the spring 43, so as to close the valve ports 45. This prevents oil being returned to the operative clearance spaces between the rotary body and the casing 16 which are continuously evacuated by the scoop 35. The viscous fluid drive therefore "slips," and the fan is driven at a relatively low speed. It will be noted that centrifugal force acting on the valve element 40 tends to augment the force acting to close the valve so that at high speeds the return flow of oil will be reduced, and slip will occur, thus providing a form of constant speed drive.

When the sensed temperature of the cooling water at the hose 5 rises, the compressed air supply is shut off, and the ram cylinder 62 is evacuated so that the bell crank lever can pivot in an anti-clockwise direction. This leaves the valve 40 free to move inwards under the action of the spring 43 opposing the centrifugal force on the valve element. At relatively low speeds the valve ports 45 will be open, and the output speed of the fan will be proportional to the speed of the drive shaft 13, whereas when the engine speed reaches a predetermined value, the centrifugal force on element 40 will partly overcome the spring 43, the ports 45 will become partly closed, and the fan speed will become approximately constant. It will be noted that this effect is substantially independent of the viscosity of the oil because the valve in these conditions will be sensitive primarily to speed, regardless of other effects.

In the embodiment illustrated in FIGS. 4, 5 and 6 the fan hub casing comprises front and rear casing parts 70, 71 permanently connected by bolts 72 around their periphery so as to define an internal fluid chamber 73. The casing part 70 has external cooling fins 74 and is formed with a central aperture in which is located a ball thrust bearing 75 supporting and locating an output shaft 76 which is integrally connected to a rotary body in the form of a circular radial flange 77 lying within the housing 73. The shaft 76 has a flange 78 at the forward end of the housing provided with bolt holes by which the fan blades 80 are mounted on the shaft and located between resilient rubber mounting rings 81, 82 clamped between the flange 78 and a front end plate 83. At the centre of the front end of the shaft 76 and exposed to the on-coming air flow s a bimetal thermal sensing strip 85 anchored at both ends 86 by a support clip secured to the shaft and bearing at its centre on a central movable pin 87.

The circular flange plate 77 is provided with a number of spaced radial passages 90, which extend from a central chamber or reservoir 91 within the shaft 76 to points adjacent the periphery of the flange. As shown in FIG. 5 a blade or scoop 92 is attached to the external surface of the flange 77 adjacent the opening of the passage 90 and the tip of this blade is spaced by a small clearance from the internal surface 93 of the fluid housing or casing. Thus if there is relative rotation of the flange 77 in the direction of the arrow A, fluid will be impelled by this scoop inwardly along the radial passage 90 to the central chamber 91. The oil can flow through a port 94 provided in a movable valve element 95 into a reservoir chamber 96 also located within the shaft 76. With the parts in this condition the several scoops 92 thus cause the fluid in the housing 73 to be drained inwardly along the passages 90 into the central chambers 91 and 96. The reduction in volume of oil in the clearance spaces between the flange 77 and the walls of the housing 73 decreases the viscous frictional drive between the two parts thus limiting the speed of the driven shaft 76 and the fan blades mounted thereon.

When the temperature sensed by the element 85 increases beyond the preselected value the element bows and the pin 87 moves to the right as illustrated in FIG. 6 under the influence of the spring 99. The cup shaped valve element 95 is moved to the right by the spring and opens a series of valve ports 100 (see FIG. 6) which are located at different radial positions around the chamber 91 in relation to the positions of the inlet or drain passages 90. In this condition the fluid within the chamber 96 can flow outwards under centrifugal action through twin passages 101 into the two clearance spaces on opposite sides of the radial flange 77. This restores the viscous fluid drive between the two parts and the fan blades are again driven through the viscous clutch.

In the further embodiment illustrated in FIGS. 7, 8 and 9 the main components are identical with the example of FIGS. 4, 5 and 6 and like parts are indicated by the same reference numerals with an added suffix. The basic principle of operation is the same but there are the following differences. The scoop illustrated in FIG. 8 consists of a small curved metal plate 110 attached to the periphery of the flange plate 77', which in this example is of slightly reduced external diameter so that there is no necessity to provide a "flat" where the element 110 is attached. Again, as in FIG. 5, relative rotation of the member 77' in the direction of arrow A causes oil in the clearance between the parts 77' and the casing 70' 71' to be driven inwardly along the radial passage 90'. The valve arrangement for controlling the return flow also differs somewhat. In place of the cup shaped valve element 95 of FIGS. 4 and 6 there is a lever 112 pivoted to the flange plate 77' at 114 and having a flat part 115 at its extremity, which acts as a valve plate to close a valve port 113. The actuating pin 87' bears on the lever at a position adjacent its pivot 114, thus providing a mechanical advantage. In the position illustrated in FIG. 7 where the bimetallic element 85' is undistorted, and the pin 87' is in its leftwards position, the tip 115 of this lever closes the return port 113 so that oil driven inwardly along the passage 90' accumulates in the chamber 96', thus reducing the volume of oil in the clearances between the parts 77' and 70', 71', as in the previous example. When the bimetal element 85' is exposed to a higher temperature and distorts as in FIG. 9, the rod 87' moves to the right under the influence of the spring 99' and the lever 112 is rocked about its pivot 114 as shown in FIG. 9, and lifts clear of the return port 113. This permits the oil to flow back into the clearances mentioned so that the frictional viscous drive is restored.

It will be understood that the scoop 92 is effective at all times when relative rotation occurs so that there is a continuous flow of oil inwards along the passage 77' so long as oil exists in the clearance spaces, and the control of the viscous frictional drag is effected by controlling the return flow of oil to the clearance spaces.

In the constructions illustrated in FIGS. 4 to 9 the control of the viscous fluid clutch is responsive to the temmperature of the air flowing past the cooling fan and not to the temperature of a liquid coolant circuit for the engine, but the effect is comparable since the cooling air passing over the fan has previously passed through the radiator 3 and its temperature at the fan is related to the temperature of the liquid coolant and also partly to atmospheric temperature. Thus if the liquid coolant temperature rises above a selected level the air temperature at the fan will also rise and the bimetal element will respond to cause the viscous clutch to engage.

It will be noted that in these constructions the cooling fans 18, 74, are attached to the casing which is directly connected to the input drive shaft and so is continuously rotated at all times regardless of whether the viscous drive is fully engaged or not, thus providing optimum cooling effect. Also as pointed out above the fluid casing and the cooling fins which are liable to become heated appreciably as a result of the energy imparted to the viscous fluid, are separated physically and in an axial sense from the fan ring so that the latter can safely be mounted in rubber.

I claim:

1. A rotary cooling fan including a variable speed torsion drive, comprising an annular casing provided with means for connection to an input drive shaft at one end, an output shaft extending through a central aperture at the other end of said casing and having a plurality of fan blades secured thereto, an inner rotary body located within said casing and secured to said output shaft, said rotary body and said casing being formed with cooperating closely spaced surfaces defining a clearance space, means for retaining a quantity of a viscous liquid in the space between said surfaces, a liquid reservoir formed within said rotary body or in said output shaft, scoop means mounted on said inner body for impelling liquid from said clearance space to said reservoir as a result of relative rotation between said rotary body and casing, valve means controlling the return flow of liquid from said reservoir to said clearance space, a temperature responsive element located externally of said casing, and actuating means for operating said valve in response to sensed changes of temperature by said element.

2. A rotary cooling fan according to claim 1, in which said casing is formed with external cooling fins, and said fan blades are supported from said drive shaft through an elastomeric mounting.

3. A rotary cooling fan according to claim 1, in which said reservoir is positioned centrally on the axis of rotation.

4. A rotary cooling fan according to claim 1, in which said temperature responsive element is mounted on said output shaft.

5. A rotary cooling fan according to claim 1, in which said temperature responsive element is connected to said valve through a force-multiplying device.

6. A rotary cooling fan according to claim 1, in which said temperature responsive element is a bimetallic device.

7. A rotary cooling fan according to claim 1, in which said rotary body is a thin annular plate.

8. A rotary cooling fan according to claim 1, in which said scoop means for impelling liquid from the clearance space towards the reservoir is positioned on the peripheral edge surface of said rotary body, and associated with a flow passage leading into said reservoir.

* * * * *